Patented Mar. 4, 1930

1,749,452

UNITED STATES PATENT OFFICE

ELMER H. STUART, OF INDIANAPOLIS, INDIANA, ASSIGNOR TO ELI LILLY AND COMPANY, OF INDIANAPOLIS, INDIANA, A CORPORATION OF INDIANA

EPHEDRINE-KETONE COMPOUND AND SOLUTION AND PROCESS OF PREPARING SUCH COMPOUND

No Drawing. Application filed August 20, 1928, Serial No. 300,946. Renewed January 8, 1930.

My present invention relates to certain new chemical compounds, involving the combination of ephedrine with ketones, to oil solutions of such compounds, and to the process of preparing such compounds.

These new compounds have certain advantages in connection with the use of ephedrine, especially in certain physiological treatments; as they appear to be quite generally less irritating than the alkaloid ephedrine itself, in many instances are oil-soluble or at least more oil-soluble than the alkaloid ephedrine itself, and in most instances are substantially equally physiologically active.

In using the term "ephedrine", I have in mind not only the levo-rotatory ephedrine which is now most commonly known by that name, but also the various isomeric forms or mixtures of isomeric forms of ephedrine such as the racemic mixtures resulting from synthesis, of the general formula

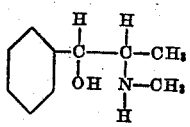

I have made a number of these compounds of ephedrine with ketones. For instance, I have combined ephedrine with acetone, acetophenone, ethyl methyl ketone, ethyl propyl ketone, menthone, and camphor; sometimes using ordinary l-ephedrine and sometimes d-pseudo-ephedrine. The combination of the ketones with ordinary l-ephedrine, which is levo-rotatory, are the ones that are physiologically the most active.

In making these compounds, the combination is apparently in the proportion of one molecule of ephedrine to one molecule of the ketone, with the elimination of one molecule of water. I am not prepared to give definitely the chemical structures of the resulting compounds; but in all instances it appears that definite compounds are formed, with definite physical properties.

In producing these compounds, I find it most convenient to dissolve the ephedrine in at least a molecularly equivalent amount of the ketone, and sometimes in more than a molecular equivalent of the ketone; melting the ketone if it is in solid form, as in the case of camphor. The reaction is often slow, so that the mixture is allowed to stand for several days or several weeks. If an excess of the ketone has been used, it may be removed after the reaction has been completed, or has progressed sufficiently, as by vacuum distillation.

In the case of camphor and menthone, I desirably use only molecularly equivalent amounts of the ketone to mix with the ephedrine; but in the case of the other ketones mentioned, I have found it simpler to use excess amounts of the ketones, and to remove the excess by vacuum distillation.

The combination usually takes place at ordinary temperatures, but sometimes slight heating is used to start the reaction. This is of course the case with camphor, because of the necessity of heating to melt the camphor.

The final products which are obtained in this way have definite physical properties.

The compound of d-pseudo-ephedrine and acetone is a liquid at ordinary temperatures, with a slight yellow color. In absolute alcohol at 25° C., it has an optical rotation of +37.25°. On assaying for nitrogen, it shows 6.64% nitrogen; which is 97.2% of the theoretical percentage of 6.83%, on the theory of a molecular combination in the proportion of 1 to 1 less one molecule of water. At 25° C. its specific gravity is 0.9816. Under 28 inches vacuum, its boiling point is 152.5° C. Its refractive index at 25° C. is 1.5048. It can be purified by distilling in vacuum. This compound as I have so far made and purified it, however, is probably not entirely pure.

The compound of l-ephedrine and acetone is a solid at ordinary temperatures. In forming this compound, I dissolve the l-ephedrine in an excess of acetone, remove the excess acetone by vacuum distillation, and let the residue cool; and the resultant compound crystallizes out as white crystals, which have a melting point of about 46° C. It can be purified by recrystallization from 95% alcohol. In absolute alcohol at 25° C., it has an optical rotation of +21.9°. On assaying for nitrogen, it shows 6.72% nitrogen; which is 98.4% of the theoretical percentage of 6.83%, on the theory of a molecular combination in the proportion of 1 to 1 less one molecule of water. This compound of l-ephedrine and acetone is readily oil soluble; and the solution of it in a neutral paraffin oil as a menstruum makes an excellent oil-ephedrine inhalant, which is found to have substantially the physiological properties of ephedrine but to be less irritating.

The compound of d-pseudo-ephedrine and acetophenone is a white crystalline solid at ordinary temperatures, and has a melting point of about 115° C.

The compound of ordinary l-ephedrine and acetophenone is a white crystalline solid at ordinary temperatures; and has a melting point of about 34° C.

The compound of d-pseudo-ephedrine with ethyl methyl ketone is a liquid at ordinary temperatures, and has the appearance of a light yellow oil. In absolute alcohol at 25° C., it has an optical rotation of +42.2°.

The compound of ordinary l-ephedrine and ethyl methyl ketone is a liquid at ordinary temperature. As I have prepared it, it is almost colorless. In absolute alcohol at 25° C., it has an optical rotation of +1.98°.

The compound of d-pseudo-ephedrine and ethyl propyl ketone is an oily liquid at ordinary temperatures, with a light yellow color. In absolute alcohol at 25° C., it has an optical rotation of +45.1°.

The compound of ordinary l-ephedrine and menthone is a solid at ordinary temperatures, in the form of white crystals having a melting point of about 35° C.

The compound of d-pseudo-ephedrine and camphor is a solid at ordinary temperatures. It exists in the form of white crystals, having a melting point of 87° C. It can be purified by re-crystallization from 95% alcohol. In absolute alcohol at 25° C., it has an optical rotation of +49°.

The compound of ordinary l-ephedrine and camphor is apparently a liquid at ordinary temperatures; but on cooling in a refrigerator, colorless crystals are observed to form, although I have not determined the physical properties of such crystals. In absolute alcohol at 25° C., the compound has an optical rotation of +17.75°.

The foregoing are merely a few examples of a number of compounds of this nature which may be produced.

The physical properties given above of the various compounds may be found to vary slightly upon further purification. For instance, the compounds which are described as having a slight yellow color may be found on further purification to be white; and perhaps to have higher melting points than those given.

All the compounds specifically named are oil-soluble to a greater or less extent. When so dissolved in oil as a menstruum, and especially in paraffin oil, the resultant oil solutions are found to be suitable as oil-ephedrine inhalants or nasal sprays. My tests have been most complete on the compound of ordinary l-ephedrine and acetone; which compound is found to be soluble in paraffin oil to at least 5%, at a temperature of 15° C. The compounds which are less soluble in paraffin oil can nevertheless be made to dissolve in paraffin oil if certain other substances are added; as, for instance, methyl alcohol, ethyl alcohol, iso-propyl alcohol, or propyl alcohol.

The fairly ready oil solubility of these compounds of ephedrine with ketones makes them readily available for use in oil, as for application in the nose. Most of these oil solutions when used as nasal sprays or inhalants are substantially non-irritating to the mucous membranes, and all of them are apparently less irritating than is the oil solution of the alkaloid ephedrine itself.

All of the ephedrine-ketone compounds which I have preferred are soluble in alcohol.

I claim as my invention:

1. A compound obtainable by reacting an ephedrine with a ketone.

2. A compound obtainable by the reaction of l-ephedrine and a ketone.

3. A compound obtainable by the reaction of l-ephedrine and acetone.

4. The process of producing a compound between ephedrine and a ketone, which consists in bringing together a quantity of ephedrine and at least a molecular equivalent amount of a ketone in liquid form.

5. The process of producing a compound between ephedrine and a ketone, which consists in bringing together a quantity of ephedrine and an excess of a ketone in liquid form.

6. The process of producing a compound between ephedrine and a ketone, which consists in bringing together a quantity of ephedrine and an excess of a ketone in liquid form, and removing the excess of the ketone.

7. A nasal spray, consisting in oil as a menstruum, and a compound dissolved therein that is obtained by reacting an ephedrine with a ketone.

8. A nasal spray, consisting in oil as a menstruum, and a compound dissolved therein that is obtained by the reaction of l-ephedrine and a ketone.

9. A nasal spray, consisting in oil as a menstruum, and a compound dissolved therein that is obtained by the reaction of l-ephedrine and acetone.

In witness whereof, I have hereunto set my hand at Indianapolis, Indiana, this 17th day of August, A. D. one thousand nine hundred and twenty-eight.

ELMER H. STUART.

CERTIFICATE OF CORRECTION.

Patent No. 1,749,452. Granted March 4, 1930, to

ELMER H. STUART.

It is hereby certified that error appears in the printed specification of the above numbered patent requiring correction as follows: Page 2, line 88, for the word "preferred" read "prepared"; and that the said Letters Patent should be read with this correction therein that the same may conform to the record of the case in the Patent Office.

Signed and sealed this 8th day of April, A. D. 1930.

(Seal)

M. J. Moore,
Acting Commissioner of Patents.